United States Patent [19]

Obara et al.

[11] 4,258,259
[45] Mar. 24, 1981

[54] INFRARED DETECTOR

[75] Inventors: Hiroshi Obara; Tetuaki Kon, both of Iwaki, Japan

[73] Assignee: Kureha Kagaku Kogyo Kabushiki Kaisha, Tokyo, Japan

[21] Appl. No.: 38,827

[22] Filed: May 14, 1979

[30] Foreign Application Priority Data

May 22, 1978 [JP] Japan ................................. 53-60812

[51] Int. Cl.³ ............................ G01J 1/00; G01T 1/22
[52] U.S. Cl. .................................... 250/338; 250/370
[58] Field of Search ............... 250/338, 370, 340, 342; 73/355 R, 362 CP

[56] References Cited

U.S. PATENT DOCUMENTS

| | | | |
|---|---|---|---|
| 3,539,803 | 11/1970 | Beerman | 250/338 |
| 3,772,518 | 11/1973 | Murayama et al. | 250/211 R |
| 4,147,562 | 4/1979 | Chiang et al. | 250/338 |

Primary Examiner—Alfred E. Smith
Assistant Examiner—Janice A. Howell
Attorney, Agent, or Firm—Wegner & Bretschneider

[57] ABSTRACT

An infrared detector comprising a polymeric pyroelectric device and a field effect transistor as an impedance conversion circuit.

14 Claims, 4 Drawing Figures

INFRARED DETECTOR

BACKGROUND OF THE INVENTION

This invention concerns an infrared detector using a pyroelectric device composed of a high polymer material and, more specifically, it relates to an infrared detector capable of effectively processing electric signals obtained from the pyroelectric device.

As known to the relevant field of art, the state of polarization in a pyroelectric device is changed with the changes in the temperature therein, and heat radiation such as of infrared rays to the pyroelectric device can be detected by taking out the changes in the polarization as electric signals. Since the electric signals taken out correspond to the changes in the temperature of the device, however, after the temperature in the device has been settled to a constant temperature in stationary infrared irradiation to the device, electric signals capable of detecting the presence or absence of the infrared irradiation can no more be taken out from the device. In view of the above, conventional infrared detectors using a pyroelectric device are generally provided with a chopper on the infrared irradiation side so as to apply intermittent infrared irradiation to the irradiated surface of the pyroelectric device for obtaining electrical signals capable of detecting infrared irradiation even in the stationary infrared irradiation.

In addition, since the pyroelectric device generally has an electric capacitivity and a high internal impendance, the device is generally used in combination with an impedance conversion circuit comprising a field effect transistor (FET) for the procession of electrical signals taken out from the device.

While pyroelectric devices composed of high polymer substance and having very excellent pyroelectric property have been known and application of them to the infrared detector has been proposed recently, mere combination of such a pyroelectric device and an impedance conversion circuit comprising a field effect transistor can not provide effective utilization of the excellent pyroelectric property of the device, and the electric signals obtained from the pyroelectric device can not be issued from the impedance circuit depending on the case. Upon intermittent infrared irradiation by way of the chopper to the pyroelectric device, the pyroelectric device produces an electric signal acting as a bias voltage as well as electric signals corresponding to the intermittent infrared irradiation. If the electric signal acting as the bias voltage goes near or lower than the pinch-off voltage of the N-type field effect transistor, the output electric signals corresponding to the intermittent infrared irradiation are clipped or no output electric signals are issued at all. The above phenomenon is particularly remarkable in the pyroelectric devices of excellent pyroelectric property and, therefore, their excellent property can not effectively be utilized.

An object of this invention is to provide an infrared detector capable of converting the internal impedance of a pyroelectric device and effectively processing the electrical signals taken out from a pyroelectric device.

Another object of this invention is to provide an infrared detector capable of effectively processing electrical signals taken out from a pyroelectric device having an excellent pyroelectric property.

Another object of this invention is to provide an infrared detector capable of converting the impedance in a simple structure.

Another object of this invention is to provide an infrared detector capable of generating electric signals ranging from dc current to high frequency ac current as it is that can be obtained from the pyroelectric device.

Another object of this invention is to provide an infrared detector keeping electric signals issued during operation from the impedance conversion circuit from being clipped.

An additional object of this invention is to provide an infrared detector in which a pyroelectric device and an impedance conversion circuit can be integrated in a small size.

SUMMARY OF THE INVENTION

This invention provides a pyroelectric infrared detector in which the positive electrode of a polymeric pyroelectric device is connected to the gate of an N-type field effect transistor, or the negative electrode of the pyroelectric device is connected to the gate of a P-type field effect transistor.

The polymeric pyroelectric device is formed by mounting electrode plates on both sides of a thin film or sheet having a pyroelectric property obtained by poling, under a dc electric field, a sheet or film of a high polymer substance prepared by polymerizing a highly polarizing monomer such as, for example, vinylfluoride, vinylidenefluoride, vinylchloride, vinylidenechloride, chlorofluorovinylidene, trifluoroethylene or the like or by copolymerizing such monomer as a basic ingredient with another monomers. A film or sheet having a pyroelectric property obtained by poling, under a high dc electric field, a film or a sheet having $\beta$-crystal structure obtained by mono- or poly-axially stretching a film or sheet prepared from vinylidenefluoride homopolymer or a copolymer comprising vinylidenefluoride, preferably, in more than 60% by weight as a basic ingredient is particularly preferred since it has a very excellent pyroelectric property.

While it is preferred to form the pyroelectric device with a thin film or sheet for decreasing the thermal time constant, the pyroelectric device may alternatively be prepared from a thick polymeric film or sheet, or it may be formed by laminating a plurality of pyroelectric polymeric films or sheets either thin or thick. In addition, the pyroelectric device may be formed in the shape of a plate or an adequately curved cap.

The field effect transistor used herein is, preferably, of a junction gate type and the positive electrode of the high polymeric pyroelectric device is connected to the gate of the transistor if it has an N-type channel, that is, if it is an N-type transistor and the negative electrode of the pyroelectric device is connected to the gate of the transistor if it has a P-type channel, that is, if it is a P-type transistor. The positive electrode of the pyroelectric device means the electrode plate on the side that is positively charged when the temperature in the device rises upon infrared irradiation to the device, and the negative electrode of the pyroelectric device means the electrode on the side that is negatively charged when the temperature of the device rises upon infrared irradiation respectively. In another preferred embodiment, an insulated gate type field effect transistor is used instead of the junction gate type field effect transistor in a similar arrangement.

In one preferred embodiment, chopper means is provided for the infrared detector for intermittent irradiation of infrared rays. However, if an object to be detected is a travelling object, heat irradiation from the moving object can preferably be detected without such chopper means.

DESCRIPTION OF THE ACCOMPANYING DRAWINGS

This invention is to be described in more details referring to the accompanying drawings, by which the foregoing and other objects, as well as the features of this invention will be made clearer, in which.

PREFERRED EMBODIMENT

Figure 1:
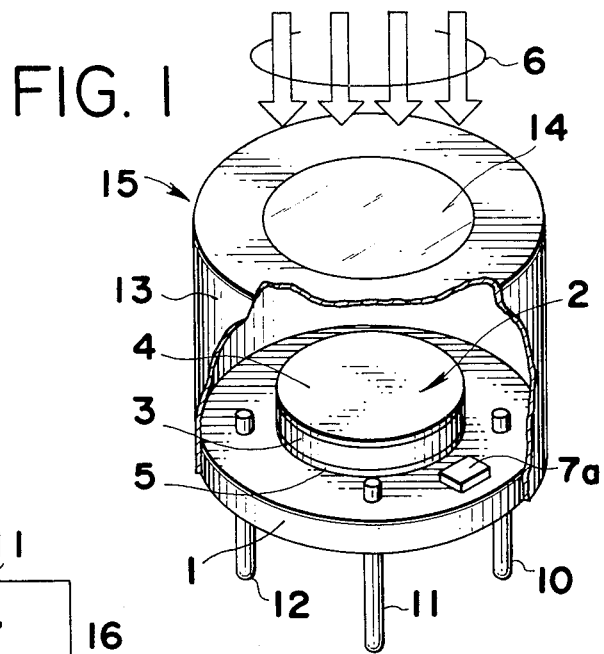
FIG. 1 is a perspective view of a preferred embodiment of the infrared detector according to this invention.
Figure 2:
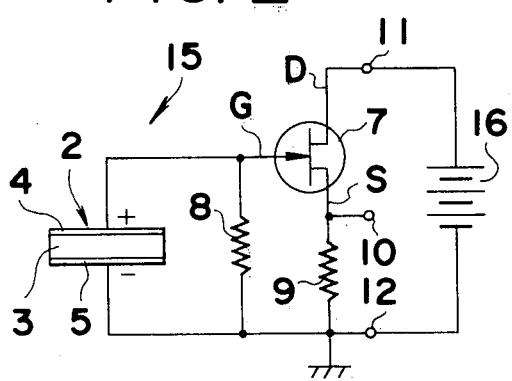
FIG. 2 is a circuit diagram for the explanation of electrical connections in the infrared detector shown in FIG. 1.
Figure 3:
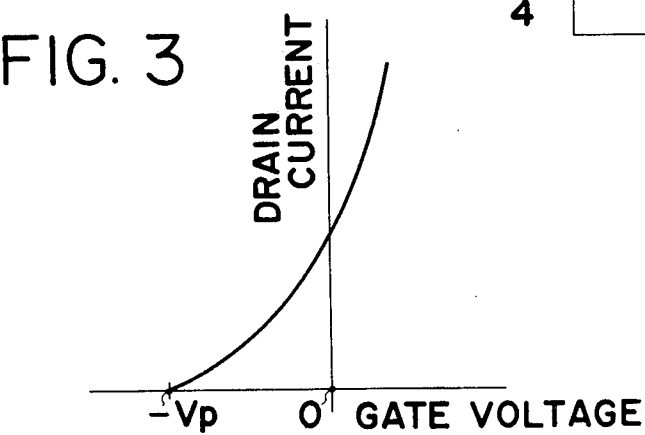
FIG. 3 is a graph for showing static characteristics of the field effect transistor used in the infrared detector shown in FIG. 1.

Referring to FIG. 1 to FIG. 3, a flat and disc-shaped pyroelectric device 2 secured to a substrate 1 is formed by forming electrode plates 4 and 5 on both surfaces of a high polymer film 3 through vapor deposition or bonding. The high polymer film is preferably prepared from a pyroelectric polyvinylidenefluoride film. The film 3 is formed as a thin film or preferably several $\mu$m to ten and several $\mu$m in thickness in order to decrease its thermal time constant where a particularly rapid responsivity is required. While on the other hand, the electrode plates 4 and 5 are formed as thin films as in the film 3 in which the electrode plate 4 on the side irradiated with infrared rays 6 is preferably prepared from a transparent electrode. The film 3 is disposed in such a way that the positive charges are produced on the electrode plate 4 and negative charges are resulted on the electrode plate 5 when temperature changes are resulted in the pyroelectric device 2. The substrate 1 is generally prepared from a material having both thermal and electric insulating natures. The substrate 1 is further secured with a semiconductor chip 7a formed with an N-type field effect transistor 7 and resistors 8 and 9. The transistor 7 is a junction gate type transistor, in which the gate G is connected to the resistor 8 and the electrode plate 4, the source S is connected to the resistor 9 and an output terminal 10, and the drain D is connected to a power source terminal 11. A grounding terminal 12 is connected to the resistors 8 and 9 and the electrode plate 5. By the above structure, the impedance conversion circuit consisting of the resistors 8 and 9 and the field effect transistor 7 is constituted as a source follower, which operates so as to convert the high internal impedance of the pyroelectric device into a low internal impedance in an equivalent manner. These circuit connections are not shown in FIG. 1. The pyroelectric device 2 and the semiconductor chip 7a are covered and protected with a casing 13 and the upper face of the can case 13 is provided with a window 14 so that the irradiated infrared rays may transmit to the inside of the can casing 13. The window 14 is provided with a transparent glass or lens. Chopper means may be provided if necessary above the window 14 for the intermittent irradiation of the infrared rays 6.

In the infrared detector 15 constituted as above, electric power from an external power source 16 is supplied in operation between the terminals 11 and 12 and electrical signals corresponding to the changes in the temperature of the device 2 upon irradiation of infrared rays 6 are issued by way of the transistor 7 from between the terminals 10 and 12.

While the pyroelectric device 2 composed of a polymeric substance such as polyvinylidenefluoride has a high pyroelectric property, electric signals corresponding to irradiated infrared rays can be taken out by way of the transistor 7 from between the terminals 10 and 12 even if the device 2 has such a high pyroelectric property by connecting the pyroelectric device 2 and the field effect transistor 7, that is, by connecting the electrode plate 4 as the positive electrode of the pyroelectric device 2 with the gate G of the transistor 7 as shown in FIG. 2. If, otherwise, the infrared detector is formed in a different connection from that shown in FIG. 2, in which the electrode plate 5 is connected to the gate of the transistor 7 and the electrode plate 4 is connected to the grounding side, no electrical signals corresponding to the infrared irradiation can be issued from the source S of the transistor 7, for example, where the infrared input is relatively great, particularly, more than 50 $\mu$W/cm$^2$. The above phenomenon is caused, it is considered, from the fact that upon intermittent infrared irradiation by the chopper to the pyroelectric device 2, a dc signal in addition to ac signals corresponding to the intermittent infrared rays are produced from the pyroelectric device 2 and the dc signal is exerted as the bias voltage signal on the transistor 7 and that, as shown in FIG. 3, the N-type field effect transistor 7 has a negative pinch-off voltage $V_p$ in its static characteristic and the dc signal as the bias voltage signal goes lower then the above pinch-off voltage $V_p$. Generation of such dc signal from the device 2 irrespective of the intermittent infrared irradiation to the device 2 may be considered to due to the fact that unstable charge components are present in the pyroelectric device 2, that is, in the film 3 and the components may be issued together with the rise in the temperature of the device 2. Accordingly, by the connection of the electrode plate 4 as the positive electrode to the gate G of the transistor 7, if the dc signal as the bias voltage signal is applied to the gate G of the transistor 7, this dc signal is produced always at a value greater than the pinch-off voltage $V_p$ of the transistor 7 on the side of positive voltage. Consequently, the transistor 7 is not put to a cut-off state thereby can produce electric signals corresponding to the intermittent infrared irradiation from between the terminals 10 and 12 with no clipping.

Figure 4:
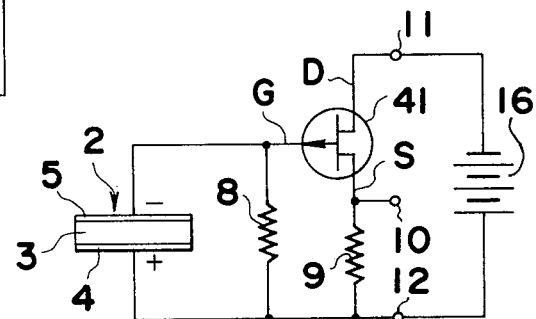
FIG. 4 is a circuit diagram for showing electrical connections in another preferred embodiment of the infrared detector according to this invention.

FIG. 4 shows another embodiment in which a P-type field effect transistor is used. In FIG. 4, the gate G of the P-type field effect transistor 41 is connected to the electrode plate 5 of the pyroelectric device 2, while on the other hand, the electrode plate 4 of the pyroelectric device 2 is connected to resistors 8 and 9 and a grounding terminal 12. By connecting the pyroelectric device 2 and the impedance conversion circuit consisting of the resistors 8 and 9 and the P-type field effect transistor 41 in such a manner, electric signals corresponding to the intermittent infrared irradiation can preferably be issued from between the terminal 10 of the transistor 41 and the grounding terminal 12 without putting the transistor 41 to its cut-off stage by the dc electric signal as the bias voltage signal obtained from the pyroelectric device 2 during operation in the same manner as in the use of the N-type field effect transistor.

What is claimed is:

1. A pyroelectric infrared detector comprising an N-type field effect transistor, and a polymeric pyroelectric device having a polymeric pyroelectric member and electrode plates on the both sides of said member, said device being connected so that an electrode plate producing positive charges because of temperature increases resulting from incident infrared radiation is connected to the gate of said transistor.

2. A pyroelectric infrared detector comprising a P-type field effect transistor, and a polymeric pyroelectric device having a polymeric pyroelectric member and electrode plates on the both sides of said member, said device being connected so an electrode plate producing negative charges because of increasing temperature resulting from incident infrared radiation is connected to the gate of said transistor.

3. The infrared detector as claimed in claim 1 or 2, in which the polymeric pyroelectric member is composed of a polyvinylidenefluoride film having a pyroelectric property.

4. The infrared detector as claimed in claim 1 or 2, in which the polymeric pyroelectric member is composed of a polyvinylfluoride film having a pyroelectric property.

5. The infrared detector as claimed in claim 3, in which the field effect transistor is a junction gate type transistor.

6. The infrared detector as claimed in claim 4, in which the field effect transistor is a junction gate type transistor.

7. The infrared detector as claimed in claim 1 or 2, in which the field effect transistor is used as a source follower.

8. The infrared detector as claimed in claim 3, in which the field effect transistor is used as a source follower.

9. The infrared detector as claimed in claim 4, in which the field effect transistor is used as a source follower.

10. The infrared detector as claimed in claim 1 or 2, in which the pyroelectric device and the field effect transistor are mounted integratedly in a casing.

11. The infrared detector as claimed in claim 3, in which the pyroelectric device and the field effect transistor are mounted integratedly in a casing.

12. The infrared detector as claimed in claim 4, in which the pyroelectric device and the field effect transistor are mounted integratedly in a casing.

13. A pyroelectric infrared detector comprising:
a polymeric pyroelectric member having first and second electrode plates disposed on said member, said plates producing a charge therebetween as a result of an increased temperature in response to incident infrared radiation;
a source follower circuit having a field effect transistor with gate, drain and source connections, a resistor connected between said source connection and a first terminal, said drain connection being connected to a second terminal, and a second resistor connected between said gate connection and said first terminal;
said first and second plates being connected to said gate connection and said first terminal in a polarity to bias said transistor gate connection to prevent pinch off of said transistor; and
means for applying a voltage potential between said first and second terminals of a polarity to provide a current flow through said first resistor in response to a voltage potential between said first and second electrodes.

14. A pyroelectric infrared detector comprising:
a polymeric pyroelectric member having first and second electrode plates disposed on said member, said plates producing a charge therebetween as a result of an increased temperature in response to incident infrared radiation;
a source follower circuit having a field effect transistor with gate, drain and source connections, a resistor connected between said source connection and a first terminal, said drain connection being connected to a second terminal, and a second resistor connected between said gate connection and said first terminal;
said first and second plates being connected to said gate connection and said first terminal in a polarity to bias said transistor gate connection to prevent pinch off of said transistor; and
said first and second terminals being adapted to receive a voltage potential of a polarity to provide a current flow through said first resistor.

* * * * *